(12) United States Patent
Rojas-Fernandez et al.

(10) Patent No.: US 12,454,558 B2
(45) Date of Patent: Oct. 28, 2025

(54) TFEB MUTANTS AND THEIR USE IN THE TREATMENT AND/OR PREVENTION OF DISORDERS THAT REQUIRE THE INDUCTION OF THE CELLULAR AUTOPHAGY-LYSOSOMAL SYSTEM

(71) Applicant: UNIVERSIDAD AUSTRAL DE CHILE, Valdivia (CL)

(72) Inventors: Alejandro Rojas-Fernandez, Valdivia (CL); Patricia Burgos, Valdivia (CL); Alexis González, Valdivia (CL)

(73) Assignee: UNIVERSIDAD AUSTRAL DE CHILE, Valdivia (CL)

( * ) Notice: Subject to any disclaimer, the term of this patent is extended or adjusted under 35 U.S.C. 154(b) by 808 days.

(21) Appl. No.: 17/604,321

(22) PCT Filed: Apr. 16, 2019

(86) PCT No.: PCT/CL2019/050028
§ 371 (c)(1),
(2) Date: Oct. 15, 2021

(87) PCT Pub. No.: WO2020/210921
PCT Pub. Date: Oct. 22, 2020

(65) Prior Publication Data
US 2022/0185854 A1 Jun. 16, 2022

(51) Int. Cl.
*A61K 38/17* (2006.01)
*C07K 14/47* (2006.01)
*A61K 38/00* (2006.01)

(52) U.S. Cl.
CPC .............. *C07K 14/47* (2013.01); *A61K 38/00* (2013.01)

(58) Field of Classification Search
None
See application file for complete search history.

(56) References Cited

U.S. PATENT DOCUMENTS

2012/0040451 A1  2/2012  Ballabio et al.

FOREIGN PATENT DOCUMENTS

EP  2 683 733  8/2017
WO  2012/120044  9/2012

OTHER PUBLICATIONS

Mouse homolog of TFEB, Uniprot sequence Q9R210 last updated 2001.*
Rodriguez, Manuel S. et al., "Sumo-1 conjugation in vivo requires both a consensus modification motif and nuclear targeting." J. Biol. Chem. (2001) 276(16) p. 12654-12659.*
Human TFEB sequence (Uniprot entry P19484, last updated 2001.*
Miller, et al., "Sumoylation of MITF and Its Related Family Members TFE3 and TFEB", The Journal of Biological Chemistry, vol. 280, No. 1, Jan. 7, 2005, pp. 146-155.
Sardiello, et al., A Gene Network Regulating Lysosomal Biogenesis and Function, Science, vol. 325, No. 5939, Jul. 24, 2009, pp. 473-477.
Pichler, et al., "SUMO Conjugation—a mechanistic view", BioMol Concepts, vol. 8, No. 1, 2017, pp. 13-36.
Martini-Stoica, et al., "The Autophagy-Lysosomal Pathway in Neurodegeneration: A TFEB Perspective", Trends in Neurosciences, vol. 39, No. 4, Apr. 2016, pp. 221-234.
Kurtishi, et al., "Cellular Proteostasis in Neurodegeneration", Molecular Neurobiology, vol. 56, 2019, pp. 3676-3689.
Kim, et al., "PPAR-a Activation Mediates Innate Host Defense through Induction of TFEB and Lipid Catabolism", J Immunol vol. 198, Mar. 2017, pp. 3283-3295.
Dikic, Ivan, "Proteasomal and Autophagic Degradation Systems", Annu. Rev. Biochem., vol. 86, 2017, pp. 31.1-31.32.
Martina, et al., "MTORC1 functions as a transcriptional regulator of autophagy by preventing nuclear transport of TFEB", Autophagy, vol. 8, No. 6, Jun. 2012, pp. 903-914.
Palmieri, et al., "Characterization of the Clear network reveals an integrated control of cellular clearance pathways", Human Molecular Genetics, vol. 20, No. 19, 2011, pp. 3852-3866.
Magini, et al., "TFEB activation restores migration ability to Tsc1-deficient adult neural stem/progenitor cells", Human Molecular Genetics, vol. 26, No. 17, 2017, pp. 3303-3312.
Settembre, et al., "A lysosome-to-nucleus signalling mechanism senses and regulates the lysosome via mTOR and TFEB", The EMBO Journal, vol. 31, 2012, pp. 1095-1108.
Pena-Llopis, et al., "Regulation of TFEB and V-ATPases by mTORC1", The EMBO Journal, vol. 30, 2011, pp. 3242-3258.
Herhaus, et al., Expanding the Ubiquitin code through post-translational modification, EMBO reports, vol. 16, No. 9, 2015, pp. 1071-1083.
Pastore, et al., "TFEB and TFE3 cooperate in the regulation of the innate immune response in activated macrophages", Autophagy, vol. 12, No. 8, 2016, pp. 1240-1258.
Brady, et al., "Emerging roles for TFEB in the immune response and inflammation", Autophagy, vol. 14, No. 2, 2018, pp. 181-189.
Martina, et al., "TFEB and TFE3: The art of multi-tasking under stress conditions", Transcription, vol. 8, No. 1, 2017, pp. 48-54.
Stolz, et al., "Cargo recognition and trafficking in selective autophagy", Nature Cell Biology, vol. 16, No. 6, Jun. 2014, pp. 495-501.

(Continued)

*Primary Examiner* — Fred H Reynolds
(74) *Attorney, Agent, or Firm* — HSML P.C.

(57) ABSTRACT

The invention relates to constitutively active mutants of the transcription factor TFEB, which can mutate the lysine of one or both sites of positions 219 and 347; and/or also mutate the glutamic acid of one or both sites of positions 221 and 349, in order to eliminate the SUMOylation of the protein. By replacing these residues either from positions 219 and/or 221 and/or 347 and/or 349 by any other amino acid (such as arginine or alanine), it gives rise to a mutated TFEB, which more actively induces the expression of genes and protein synthesis of the lysosomal and autophagic pathway. Such as lysosomal storage disorders, neurodegenerative diseases, liver diseases, muscle diseases and metabolic diseases, and/or disorders or processes in the aging of the skin.

7 Claims, 6 Drawing Sheets
Specification includes a Sequence Listing.

(56) References Cited

OTHER PUBLICATIONS

Roczniak-Ferguson, et al., "The Transcription Factor TFEB Links mTORC1 Signaling to Transcriptional Control of Lysosome Homeostasis", Sci Signal, vol. 5, No. 228, Dec. 2012, 23 pages.

Visvikis, et al., "Innate Host Defense Requires TFEB-Mediated Transcription of Cytoprotective and Antimicrobial Genes", Immunity, vol. 40, No. 6, Jun. 2014, pp. 896-909.

Medina, et al., Lysosomal calcium signaling regulates autophagy via calcineurin and TFEB, Nat Cell Biol., vo. 17, No. 3, Mar. 2015, pp. 288-299.

Martina, et al., "The Nutrient-Responsive Transcription Factor TFE3, Promotes Autophagy, Lysosomal Biogenesis, and Clearance of Cellular Debris", Sci Signal., vol. 7, No. 309, Dec. 2015, 31 pages.

Gatto, et al., "AAV-mediated transcription factor EB (TFEB) gene delivery ameliorates muscle pathology and function in the murine model of Pompe Disease", Scientific Reports 7:15089, 2017, 12 pages.

Balch, et al., "Adapting Proteostasis for Disease Intervention", Science, vol. 319, Feb. 15, 2008, pp. 916-919.

Bretou, et al., "Lysosome signaling controls the migration of dendritic cells". Science Immunology, vol. 2, Oct. 2017, pp. 1-11.

International Search Report issued in International Application No. PCT/CL2019/050028, Nov. 13, 2019, 9 pages.

Giatromanolaki, et al., "Transcription Factor EB Expression in Early Breast Cancer Relates to Lysosomal/Autophagosomal Markers and Prognosis", Clinical Breast Cancer, vol. 17, issue 3, Jun. 1, 2017, pp. E119-E125—Abstract only.

Pintat, et al., "Intra-articular Injection of Mesenchymal Stem Cells and Platelet-Rich Plasma to Treat Patellofemoral Osteoarthritis: Preliminary Results of a Long-Term Pilot Study", Journal of Vascular and Interventional Radiology, vol. 28, No. 12, Dec. 2017, pp. 1708-1713—Abstract only.

Markaki, et al., "Chapter Five—Novel Insights Into the Anti-aging Role of Mitophagy", International Review of Cell and Molecular Biology, vol. 340, 2018, pp. 169-208—Abstract only.

Li, et al., "Transcription factor EB (TFEB)-mediated autophagy protects against ethyl carbamate-induced cytotoxicity", Journal of Hazardous Materials, vol. 364, Feb. 15, 2019, pp. 281-292—Abstract only.

\* cited by examiner

TFEB MUTANTS AND THEIR USE IN THE TREATMENT AND/OR PREVENTION OF DISORDERS THAT REQUIRE THE INDUCTION OF THE CELLULAR AUTOPHAGY-LYSOSOMAL SYSTEM

FIELD OF THE INVENTION

The present invention relates to mutants of transcription factor EB or TFEB, with increased activity. This transcription factor acts as a regulator in the biogenesis of lysosomes and cellular autophagic response. In a second aspect this invention also points to the use of these mutants in the treatment and/or prevention of disorders such as lysosomal storage, neurodegenerative diseases, liver diseases, muscle diseases and metabolic diseases that need the induction of the cellular autophagy/lysosomal system.

Background of the Invention

The correct replacement of proteins is essential to maintain the homeostasis of cellular components, so that different human diseases are linked to abnormalities in protein degradation systems (Cellular Proteostasis in Neurodegeneration. Kurtishi A, Rosen B, Patil K S, Alves G W, Møller S G. Mol Neurobiol. 2018 Sep. 4. doi: 10.1007/s12035-018-1334-z, Adapting proteostasis for disease intervention. Balch W E, Morimoto R I, Dillin A, Kelly J W. Science. 2008 Feb. 15; 319(5865):916-9. doi: 10.1126/science.114144.

The control of protein rotation is mediated by two main mechanisms: the Ubiquitin-Proteasome System (UPS) and Autophagy and Autophagic Degradation Systems. Dikic I Annu Rev Biochem. 2017 Jun. 20; 86:193-224. doi: 10.1146/annurev-biochem-061516-044908. Ubiquitin chains play a key role in both pathways, participating directly as a signal of proteasomal degradation, as well as for the selection of material for endo-lysosomal and autophagic degradation (Cargo recognition and trafficking in selective autophagy. Stolz A et al. Nat Cell Biol. 2014 June; 16(6): 495-501. doi: 10.1038/ncb2979; Expanding the ubiquitin code through post-translational modification. Herhaus L1, Dikic 12 EMBO Rep. 2015 September; 16(9):1071-83. doi: 10.15252/embr.201540891. Epub 2015 Aug. 12).

Other regulators of these processes are transcription factors, such as the MiT family of transcription factors, which includes MiTF, TFE3, TFEB and TFEC, which participate in the biogenesis of autophagosomes and lysosomes ("A lysosome-to-nucleus signalling mechanism senses and regulates the lysosome via mTOR and TFEB. Settembre C et al, EMBO J. 2012 Mar. 7; 31(5):1095-108. doi: 10.1038/emboj.2012.32. Epub 2012 Feb. 17; Regulation of TFEB and V-ATPases by mTORC1. Pena-Llopis S et al, EMBO J. 2011 Jul. 29; 30(16):3242-58. doi: 10.1038/emboj.2011.257).

Of the transcription factors mentioned above being TFEB corresponds to the most characterized, it has been reported that it controls the transcription of genes by direct union, in addition to being involved in the biogenesis and coordinated regulation of autophagosomes and lysosomes (CLEAR, from its acronym in English "Coordinated Lysosomal Expression and Regulation") present in several promoters (A Gene Network Regulating Lysosomal Biogenes is and Function, Marco Sardiello et al, Science 25 June 200, DOI: 10.1126/science.1174447; Characterization of the CLEAR network reveals an integrated control of cellular clearance pathways. Palmieri M et al. Hum Mol Genet. 2011 Oct. 1; 20(19):3852-66. doi: 10.1093/hmg/ddr306. Epub 2011 Jul. 13; The Nutrient-Responsive Transcription Factor TFE3 Promotes Autophagy, Lysosomal Biogenesis, and Clearance of Cellular Debris, José A. Martina et al, Sci. Signal. 21 Jan. 2014: Vol. 7, Issue 309, pp. ra9 DOI: 10.1126/scisignal. 2004754).

The participation of this transcription factor in different diseases has been described, so the search for mechanisms of prevention or treatment of these diseases is of great interest to the pharmaceutical industry. For example, the over-expression of TFEB is able to improve the degradation of huntingtin poly-glutamine aggregates, toxic aggregates responsible for Huntington's disease (A Gene Network Regulating Lysosomal Biogenesis and Function, Marco Sardiello et al, Science 25 Jun. 2009, DOI: 10.1126/science.1174447). In addition, the sub-expression of TFEB restores impaired autophagy in Pompe disease (AAV-mediated transcription factor EB (TFEB) gene delivery ameliorates muscle pathology and function in the murine model of Pompe Disease, Francesca Gatto et al, Scientific Reports, Volume 7, No.: 15089 (2017)).

TFEB has also been described participating in antimicrobial responses against pathogen infections (PPAR-α Activation Mediates Innate Host Defense through Induction of TFEB and Lipid Catabolism, Yi Sak Kim et al, J Immunol Apr. 15, 2017, 198 (8) 3283-3295, DOI: https://doi.org/10.4049/jimmunol.1601920; Nunzia Pastore et al (2016) TFEB and TFE3 cooperate in the regulation of the innate immune response in activated macrophages, Autophagy, 12:8, 1240-1258, DOI: 10.1080/15548627.2016. 1179405; Innate host defense requires TFEB-mediated transcription of cytoprotective and antimicrobial genes, Visvikis O et al, Immunity. 2014 Jun. 19; 40(6):896-909. doi: 10.1016/j.immuni.2014.05.002. Epub 2014 May 29; Owen A. Brady et al (2018) Emerging roles for TFEB in the immune response and inflammation, Autophagy, 14:2, 181-189, DOI: 10.1080/15548627.2017. 1313943). Recently, members of the MiT/TFE transcription factor family have been shown to be involved in regulating the efficient clearance of mitochondria damaged during Parkin-mediated mitophagy, a key process related to early events of Parkinson's disease (Owen A. Brady et al (2018) Emerging roles for TFEB in the immune response and inflammation, Autophagy, 14:2, 181-189, DOI: 10.1080/15548627.2017. 1313943.10.1083/jcb.201501002).

TFEB also plays a crucial role in the response and development of the immune system. Its activation has been shown to increase the migration of dendritic cells (Lysosome signaling controls the migration of dendritic cells. Bretou M et al, Sci Immunol. 2017 Oct. 27; 2(16). pii: eaak9573. doi: 10.1126/sciimmunol.aak9573; Lysosomal Calcium Signalling Regulates Autophagy Through Calcineurin and TFEB, Medina et al, Nat Cell Biol, 17 (3), 288-99 March 2015, 10.1038/ncb3114), in addition to the promotion of neural/progenitor stem cell migration (NSPCs) (TFEB activation restores migration ability to Tsc1-deficient adult neural stem/progenitor cells. Magini A et al, Hum Mol Genet. 2017 Sep. 1; 26(17):3303-3312. doi: 10.1093/hmg/ddx214).

TFEB participates as a positive regulator in the face of a stressful scenario such as nutritional stress, oxidative stress, endoplasmic reticulum stress and stress caused by pathogen infection (José A. Martina & Rosa Puertollano (2017) TFEB and TFE3: The art of multi-tasking under stress conditions, Transcription, 8:1, 48-54, DOI: 10.1080/21541264.2016.1264353; The Nutrient-Responsive Transcription Factor TFE3 Promotes Autophagy, Lysosomal Biogenesis, and Clearance of Cellular Debris José A. Martina et al Sci. Signal. 21 Jan. 2014: Vol. 7, Issue 309, pp. ra9 DOI: 10.1126/scisignal.2004754).

Interestingly, TFEB has been described as being at high levels of expression in breast cancer (Transcription Factor EB Expression in Early Breast Cancer Relates to Lysosomal/Autophagosomal Markers and Prognosis. Giatromanolaki A et al. Clin Breast Cancer. 2017 June; 17(3):e119-e125. doi: 10.1016/j.clbc.2016.11.006. Epub 2016 Nov. 23. 10.1016/j.clbc.2016.11.006). In addition, nuclear translocation of TFEB and TFE3 has been described in renal cancer (Intra-articular Injection of Mesenchymal Stem Cells and Platelet-Rich Plasma to Treat Patellofemoral Osteoarthritis: Preliminary Results of a Long-Term Pilot Study. Pintat J et al. J Vasc Intery Radiol. 2017 December; 28(12):1708-1713. doi: 10.1016/j.jvir.2017.08.004. Epub 2017 Oct. 12).

As mentioned before, TFEB factor transcription is a regulator of lysosomal and autophagic function. These functions are relevant not only for the therapeutic applications described, but also in normal physiological functions such as tissue regeneration (for example, in the skin). For this reason, TFEB can be very relevant in cosmetic skin rejuvenation treatments.

Under normal nutritional conditions, TFEB is phosphorylated by mTORC1 and is actively retained in the cytoplasm by association with 13-3-3 proteins. In response to stress, TFEB is dephosphosphorylate and enters the nucleus where it triggers the expression of lysosomal and autophagic genes. Post-translational modifications such as phosphorylations are crucial events in the activation/inactivation of TFEB.

Surprisingly, the over-expression of wild TFEB leads only to a slight induction of its target genes, and without adhering to any theory, this suggests that an additional mechanism, other than nuclear localization restriction, interferes with TFEB activity.

The inventors have discovered that endogenous TFEB covalently conjugates with a small ubiquitin-like modifier SUMO (from its acronym in English, Small Ubiquitin-like MOdifier) under normal growth conditions and that this modification negatively controls TFEB transcription activity. Having understood this hitherto undeveloped regulatory mechanism, the inventors developed TFEB mutants, which constitute the invention, where such mutants, which prevent modification by SUMO, lead to a dramatic increase in their basal activity in vivo.

The inventors have further determined that SUMO-TFEB modification occurs in the nucleus and functions as the main negative regulator of basal TFEB transcriptional activity, also, as will be seen later in the examples, the mutants developed that modify SUMO modification sites in TFEB resulted in a super-active version of TFEB ("SUPER-TFEB") with great pharmaceutical potential, both in therapeutic applications for different diseases, as well as in cosmetic and skin health applications.

In the state of the art we find some documents that study TFEB, and even try to improve its function, as is done in the present invention, but none of them anticipates the invention since none modifies TFEB in order to prevent its modification by SUMO, as in this proposal. For example, the publication WO2013186398A1 (Fondazione Telethon) protects a vector for gene therapy comprising a TFEB coding sequence under the control of a promoter capable of effectively expressing said TFEB coding sequence, a host cell comprising said vector and its use in the treatment of obesity and/or metabolic syndrome. In this case, TFEB has not been modified in order to prevent its modification by SUMO, so WO2013186398A1 does not anticipate the invention.

On the other hand, methods of modulating the expression of TFEB without using mutants of this factor have been protected, for example WO2010092112A1 (Telethon Fondazions) describes a molecule that is able to modulate the expression of at least one gene involved in degradative pathways to improve cell degradation pathways and prevent or antagonize the accumulation of toxic compounds in a cell and act on a CLEAR element, such as the TFEB protein, or a synthetic or biotechnological functional derivative thereof. Moreover, WO2015131848A1 (Hong Kong Baptist Univ) protects small molecules that can potentiate autophagy and lysosome biogenesis by activating the TFEB gene that can prevent the accumulation of toxic protein aggregates in the treatment of neurodegenerative diseases.

Similarly, if some mutants have been described for TFEB, but pointing to the classical mechanism of TFEB modification, phosphorylation that we discussed previously, the publication WO2012120044A1 (Fondazione Telethon) protects a TFEB mutant that is constitutively located in the nucleus of a eukaryotic cell, where a serine residue has been replaced by the alanine residue, in the sequence corresponding to position 142 and/or 211, to achieve non-sensitive phosphorylation. The Inventors have established that the presence of TFEB in the kernel alone is not a powerful TFEB activation strategy. Our invention suggests that the basal levels of TFEB in the nucleus can be positively regulated with the modulation of its modification by SUMO.

In this way the invention provides a new and surprising solution to the technical problem of increasing the activity of the autophagic/lysosomal system, providing highly active TFEB mutants, as they are not susceptible to being modified by SUMO.

DETAILED DESCRIPTION OF THE INVENTION

Figure 1:
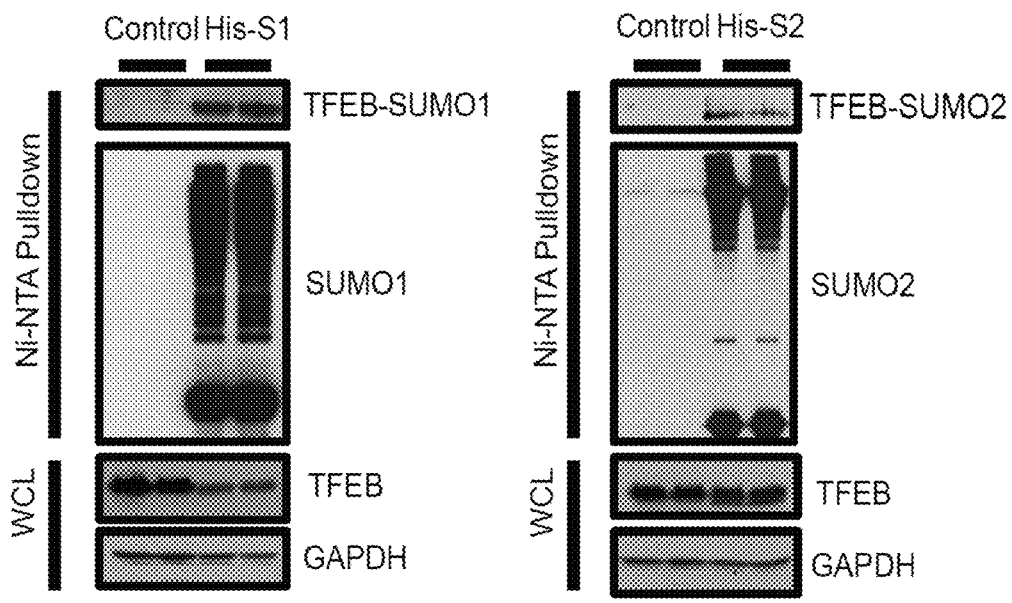
FIG. 1 Covalent modification of TFEB by SUMO-1 and SUMO-2. HeLa cells that over-express SUMO-1 or SUMO-2 fused to 6×His tag for enrichment of proteins modified by SUMO under denaturant conditions were used to determine the covalent modification of TFEB by both SUMO1 and SUMO2. It can be seen that both SUMO 1 and SUMO 2 are covalently joined to TFEB.

The present invention relates in particular to mutants constitutively active, of the transcription factor TFEB, which can mutate the lysine of one or both sites of positions 219 and 347; and/or also mutates the glutamic acid of one or both sites of positions 221 and 349, in order to eliminate the SUMO and the protein. Replacing these residues either from positions 219 and/or 221 and/or 347 and/or 349 with any other amino acid (such as arginine or alanine), gives rise to a mutated TFEB, which more actively induces gene expression and synthesis of proteins of the lysosomal and autophagic pathway.

For the expert in the art, it will be evident that, although the function in the cell is performed by the TFEB protein, it is encoded by nucleotide sequences that can be introduced to the cell as DNA or RNA, in order to express the mutant, or a directed mutagenesis can develop in order to modify the genome of the cell. All these options are within the scope of the present invention, which therefore refers to TFEB mutants with replacements at sites 219 and/or 221 and/or 347 and/or 349, and polynucleotides that encode them.

Attached to this description are the peptide sequences of examples of consensus TFEB proteins modified according to the invention, where the SEQ ID No 1, contains the mutation K219R; the SEQ ID No 2, contains the mutation K347R, the SEQ. ID No 3, contains these mutations K219R and K347R, the SEQ ID No 4, contains the mutation E221A; the SEQ ID No 5, contains the mutation E349A and the SEQ ID No 6, contains the mutations E221A and E349A. Obviously the TFEB protein may contain other mutations, which do not modify its function, and which do not interfere with the present invention. The present invention is applied on any functional TFEB protein, where the indicated mutations inhibit modification by SUMO.

As a result of this increased activity, TFEB mutants of this invention are also very efficient in the degradation of one added protein which is a model of neurodegenerative Huntington's disease known as huntingtin, as well as in the degradation of the protein added in Parkinson's disease known as alpha synuclein.

It is known that the activity of TFEB in vivo is mainly controlled by a strong restriction of its nuclear location. Mechanistically, the mTORC1 complex phosphorylates the transcription factor TFEB in the serine residue of position 211 inducing its association with proteins 14.3.3, small proteins that modulate phosphorylated protein function. This association occludes the nuclear TFEB localization signal, which is conducted in the cytoplasm retention of the complexes between the TFEB protein and the 14.3.3 proteins, (Sci Signal. 2012 Jun. 12; 5(228):ra42, doi: 10.1126/scisignal.2002790; The transcription factor TFEB links mTORC1 signaling to transcriptional control of lysosome homeostasis. Roczniak-Ferguson A et al; Jose A. Martina et al (2012) MTORC1 functions as a transcriptional regulator of autophagy by preventing nuclear transport of TFEB, Autophagy, 8:6, 903-914, DOI: 10.4161/auto.19653) thus decreasing the activity of this transcription factor.

Under the normal growth condition, mTORC1 is involved in ribosomal biogenesis, initiation of translation, and import of nutrients. However, in nutrient deprivation, the mTORC1 complex is dephosphorylate and inactive. Similarly, the phosphorylation of TFEB in the serine residue of position 211 is interrupted, and its exposed nuclear localization leads to the translocation of nuclear TFEB and the activation of this transcription factor.

TFEB activation also occurs when calcium is released through a channel called mucolipin1 located in the lysosome. Local calcium output triggers activation of calcineurin phosphatase that binds and catalyzes TFEB dephosphorylation, leading to nuclear translocation (Lysosomal calcium signalling regulates autophagy through calcineurin and TFEB, Diego L, Medina et al, Nature Cell Biology, volume 17, pages 288-299 (2015) DOI: 10.1038/ncb3114). Interestingly, mucolipin1 is also a transcriptional target of TFEB, disabling a positive feedback loop of high liposomal activity in a tissue and specifically in the process, (Lysosome signaling controls the migration of dendritic cells. Bretou M. et al. Sci Immunol, 2017 Oct. 27; 2(16). pii: eaak9573, doi: 10.1126/sciimmunol.aak9573; Lysosomal calcium signalling regulates autophagy through calcineurin and TFEB. Diego L. Medina et al, Nature Cell Biology, Volume 17, pp. 288-299 (2015)10.1038/ncb3114).

However, the understanding of the mechanisms described above has not led to an increase in the activity of TFEB, so the finding of this invention offers a powerful alternative in the positive modulation of TFEB, based on its modification by SUMO.

Inventors have established that the modification of TFEB by SUMO occurs in lysines 219 and 347. From the state of the art, it is known that the sites susceptible to being modified by SUMO usually occur in consensus sites ψ-K-x-E, where ψ is an amino acid of high hydrophobicity, K is a lysine where the modification occurs, x is any amino acid and E a charged amino acid. It is also known that the mutation of the lisine or the charged amino acid in position 2 upstream of the lysine of the consensus site prevents the SUMOylation of the protein, in this way the inventors have determined, as demonstrated in the examples, that the mutation of lysine 219, and/or glutamic acid in 221, inhibit modification by SUMO at this site, as well as the mutation of lysine 347, and/or glutamic acid at 349, inhibit modification by SUMO at the second site susceptible to be modified by SUMO in TFEB.

The invention relates to mutants of TFEB insensitive to modification by SUMO, where the amino acids of the consensus sites of Sumoylation Lys219 and/or Lys 347 and/or Glu 221 and/or Glu 349 have been replaced individually or simultaneously by any amino acid chosen between: Serine (Ser, S), Threonine (Thr, T), Cysteine (Cys, C), Asparagine (Asn, N), Glutamine (Gln, Q) and Tyrosine (Tyr, Y), Glycine (Gly, G), Alanine (Ala, A), Valine (Val, V), Leucine (Leu, L), Isoleucine (Ile, I), Methionine (Met, M), Proline (Pro, P), Phenylalanine (Phe, F) and Tryptophan (Trp, W), Aspartic Acid (Asp, D) and Glutamic: Acid (Glu, E), Lysine (Lys, K), Arginine (Arg, R) and Histidine (His, H).

Despite the above, preferably lysine residues are replaced by arginine and glutamic acid by alanine.

The present invention provides TFEB mutants with increased transcriptional activity, which is useful for treating and/or preventing diseases that compromise the cellular autophagic/lysosomal system, such as lysosomal storage disorders, neurodegenerative diseases, liver diseases, muscle diseases and metabolic diseases by modulating the expression of the CLEAR pathway (Coordinated Lysosomal Expression and Regulation") by the mutation of SUMO modification sites of the transcription factor TFEB, among which are: mucolipidosis type II, free sialic acid storage disease, infantile form, Hexosaminidase A deficiency, juvenile form, Krabbe disease (including infantile onset, late onset), metachromatic leukodystrophy, Mucolipidosis IIIA, mucopolysaccharidosis type I or Hurler syndrome, mucopolysaccharidosis type I or Scheie syndrome, mucopolysaccharidosis type I or Hurler-Scheie syndrome, Batten-Spielmeyer-Vogt-Sjogren disease, Finnish late infantile variant (CLN5), Jansky-Bielschowsky disease or infantile-late CLN, adult-onset Kufs/NCL/CLN4 disease, northern epilepsy/late infantile variant CLN8, infantile neuronal ceroid lipofuscinosis (INCL; NCL1, Haltia-Santavuori disease), beta-mannosidosis, Pompe disease/glycogen storage disease type II, pycnodysostosis, adult GM2 gangliosidosis/Sandhoff disease, infantile GM2 gangliosidosis/Sandhoff disease, juvenile GM2 gangliosidosis/Sandhoff disease, Schindler disease, free sialic acid (SSD) deposition disease or Salla disease, Tay-Sachs disease, GM2 gangliosidosis, Wolman disease, multiple sulfatase deficiency, GM2 gangliosidosis, alpha-mannosidosis, aspartilglucosaminuria, cholesterol ester storage disease, hexosaminidase A deficiency, cystinosis, Danon disease, Fabry disease, Farber's disease, fucosidosis, galactosialidosis, Gaucher disease, mucopolysaccharidosis type II or Hunter syndrome, Sanfilippo syndrome or mucopolysaccharidosis type III, Sanfilippo syndrome type B or mucopolysaccharidosis type IIIB, mucopolysaccharidosis type IV A, mucopolysaccharidosis type IV B, MPS IX—hyaluronidase deficiency, Niemann-Pick disease (including types A, B and C), neuronal ceroidlipofuscinosis (including CLN6 disease, atypical late infantile) and GM1 gangliosidosis.

The activation of the autophagic pathway, including mitophagy have been linked to the prevention of cellular aging, Novel Insights Into the Anti-aging Role of Mitophagy. Markaki M, Palikaras K, Tavernarakis N. Int Rev Cell Mol Biol. 2018; 340:169-208, doi: 10.1016/bs.ircmb.2018.05.005. Epub 2018 Jun. 20, The invention directly impacts the cellular ability to resist aging, therefore it can be used in the field of cosmetic creams, healing creams and products for the healing of chronic wounds related to metabolic diseases such as diabetes, and skin diseases such as psoriasis, Kaposi's sarcoma, seborrheic keratosis and keloids.

Recently the activation of autophagy mediated by TFEB has also been described as a new mechanism of liver protection against tobacco toxins in smokers, fermented foods and alcoholic beverages (Transcription factor EB (TFEB)-mediated autophagy protects against ethyl carbamate-induced cytotoxicity. Li Y, Ye X, Zheng X, Chen W. J Hazard Mater. 2018 Oct. 22; 364:281-292. doi: 10.1016/j.jhazmat.2018.10.037)

With all the above, it is evident that the applications of this invention will be useful to prevent or treat any alteration or process in which it is required to activate the lysosomal/autophagy pathway. Including at the same time all the disorders or processes described in the previous paragraphs, as well as all those in which they are described in the future, by the advancement of science.

The invention may be better understood in the light of the examples below. In these examples reference is made to specific sequences, which were used in the transformations, however, the invention is not limited to such sequences but to all functional sequences of TFEB whose modification by SUMO can be inhibited by modifying the residues of positions 219 and/or 221 and/or 347 and/or 349.

EXAMPLES

Example 1. Demonstration of the Modification of TFEB by SUMO

To analyze whether the transcription factor TFEB is modified by SUMO under endogenous conditions, first, cells were obtained with SUMO proteins attached to a tail of Histidine, to obtain a facilitated recovery from the cultures, and to establish if it is bound to the protein of interest TFEB. For this, 2 varieties of labeled SUMO proteins, specifically 6×His-tagged SUMO1 or 6×His-tagged SUMO2 were expressed in stable form HeLa cells, and cultured for 24 hours.

After this incubation period, SUMO conjugates were isolated under denaturant conditions by pulldown using nickel agarose beads. To detect the presence of conjugates of TFEB and SUMO, Western Blot analyses were performed using specific antibodies.

First, the normal growth condition was evaluated, and low levels of covalent modifications of TFEB by SUMO1 and by SUMO2 were observed under these normal growth conditions, the results are shown in FIG. 1. Nevertheless, it was found that both SUMO 1 and SUMO 2 covalently bind to TFEB.

Example 2. Modification of TFEB by SUMO Under Different Conditions

The HeLa cells stably over-expressing SUMO 2 His-tag, obtained in the previous example were grown under conditions of nutrient deprivation in EBBS medium.

Figure 2:
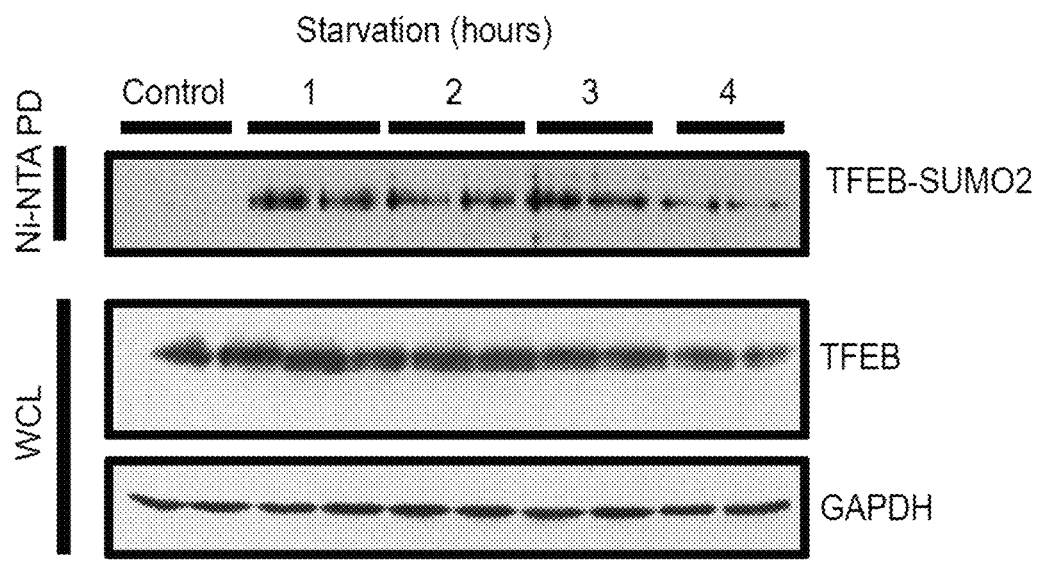
FIG. 2 Sumoylation of TFEB is induced by nutrient depletion. HeLa cells that over-express SUMO2 6×HIS-TAG were deprived of nutrients for 1, 2, 3, and 4 hours, to determine their effect on covalent modification of TFEB. The modification of TFEB by SUMO2 is appreciated within the first hours of starvation.

The results showed that rapid modification of TFEB by SUMO2 occurs within the first few hours of starvation (FIG. 2).

Figure 3:
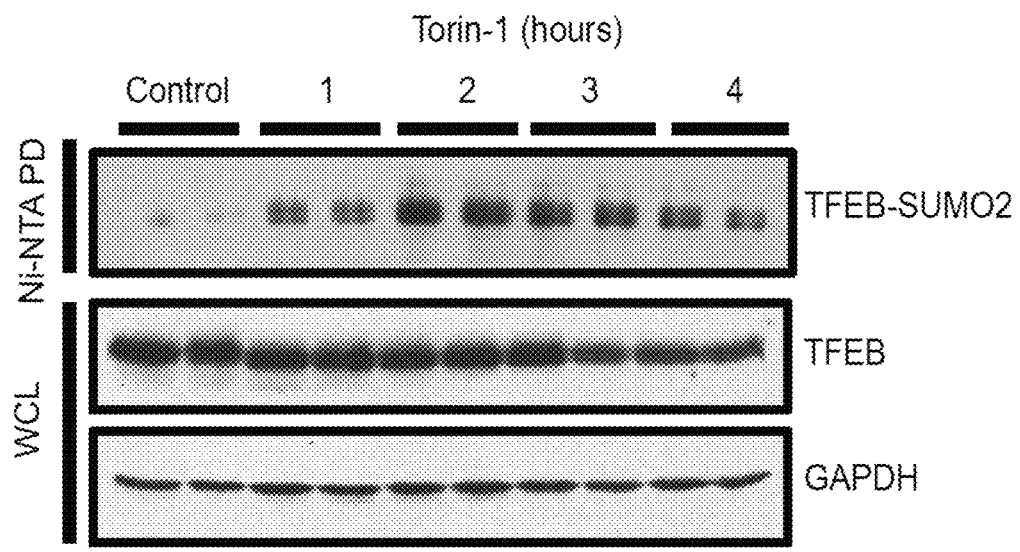
FIG. 3 Sumoylation of TFEB induced by inhibition of mTORC1. HeLa cells that over-express SUMO2 6×HIS-TAG were treated with Torin-1 (a specific inhibitor of mTORC1) to determine its effect on covalent modification of TFEB, analyzed at 1, 2, 3, 4 hours of treatment. It is observed that Torin-1 induces the modification of TFEB by SUMO2 at all times and more strongly from 2 hours of exposure.

Secondly, whether Torin-1, a selective inhibitor of mTORC1, was capable of inducing SUMO modification of TFEB, was analyzed. The results show that torin-1 triggers a strong modification of the SUMO type in TFEB after 2 hours of treatment (FIG. 3).

Example 3. Obtaining TFEB Mutants of the Invention

The inventors determined that the most likely sites of TFEB modification/SUMO should be lysine 219 and/or lysine 347. To assess whether this conclusion was correct; the inventors generated vectors that would express Wild type (WT) or mutated TFEB at position 219 and/or position 347, in both cases replacing the lysine residue with arginine.

The sequences of the mutant TFEB versions are SEQ ID Not, where lysine has been substituted at position 219 by arginine, SEQ ID No 2, where lysine has been substituted at position 347 by arginine and SEQ ID No 3, where lysine has been substituted at position 219 and at position 347 by arginine.

Example 4. Modification of TFEB by SUMO Under Different Conditions

HeLa cells expressing SUMO2-his tag were transfected in transient form with an empty vector, a vector expressing TFEB WT or vectors expressing the TFEB protein of the invention, TFEB-K219R mutant (SEQ ID No 1) TFEB-K347R mutant (SEQ ID No 2), as well as the double mutant TFEB K347/K219R (SEQ ID No 3).

Figure 4:
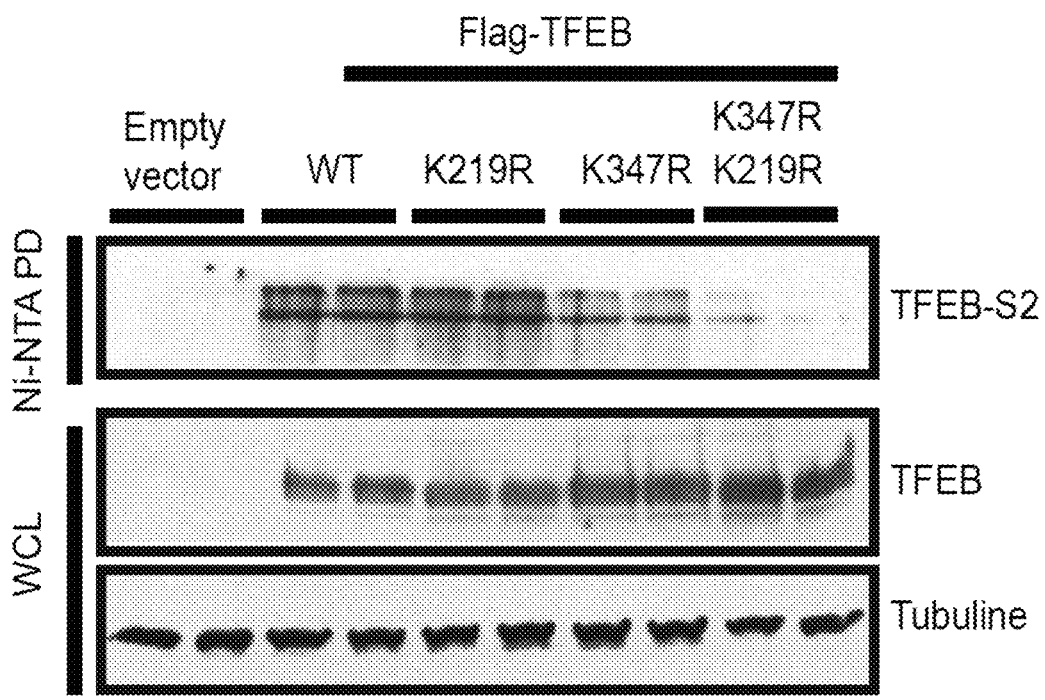
FIG. 4 Sumoylation of TFEB is inhibited by lysine mutation K219 and K347 by arginines. HeLa cells that overexpress SUMO2 6×HIS-TAG were transfected with different sumoylation mutants of TFEB to determine their effect on the covalent modification of TFEB. It is appreciated that mutants K219R and K347R partially inhibit the modification of TFEB by SUMO2, while the double mutant K219R-K347R inhibits it almost completely.

All these versions were analyzed under pulldown in denaturing conditions to determine levels of modification by SUMO (FIG. 4). The results show that SUMO modification in lysine K347 (SEQ ID No 2), initially partially identified by mass spectrometry is in fact the main residue modified by SUMO in TFEB, since Western Blot analyses show that most of these mutants do not join SUMO, Likewise, the double mutant K219R/K347R (SEQ ID No 3) leads to a sharp reduction in TFEB sumoylation. While the mutant K219R (SEQ ID No 1) is less potent in reducing the sumoylation of TFEB compared to the mutant K347R. These results indicate that there are two sites of SUMO modification in TFEB, the main one being K347 and a secondary K219.

Figure 5:
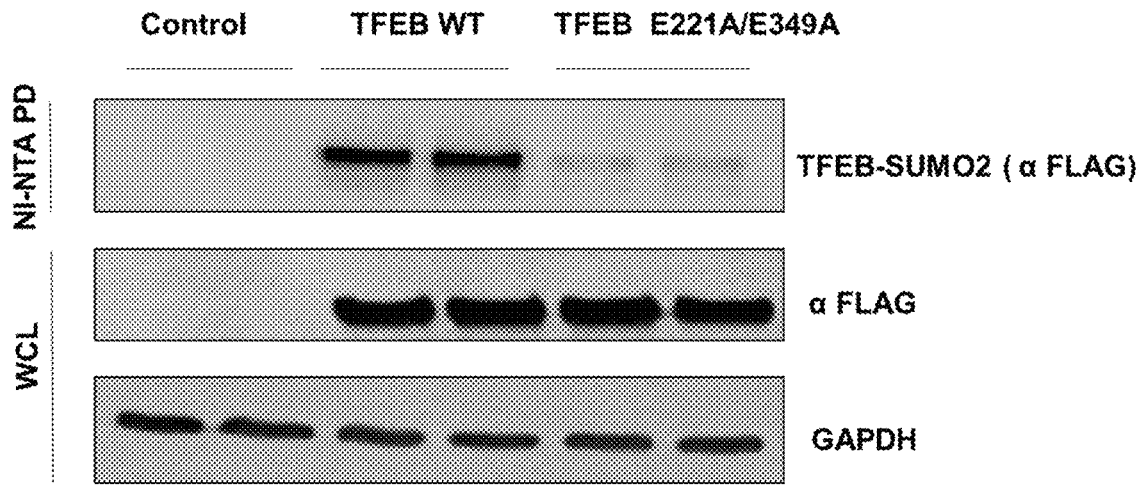
FIG. 5. HeLa cells that over-express SUMO2 6×HIS-TAG transfected with the double mutant E221 and E449 of TFEB to determine its effect on the covalent modification of TFEB. It is observed that the sumoylation of TFEB is inhibited by mutation acid residues of the consensus sequence of Sumoylation E221 and E449 by alanine FIG. 6 Increase in TFEB activity in the absence of sumoylation in Hela cells using a reporter promoting the CLEAR pathway. Parent cells, TFEB KO (decreased TFEB) and TFEB/TFE3/MITF triple KO (decreased TFEB/TFE3/MITF) were co-infected with reporter luciferase and different mutants of sumoylation of TFEB to determine the transcriptional activity of the TFEB reporter. It can be seen that mutants that inhibit sumoylation have a notable increase in the inducing activity of the CLEAR pathway.

As indicated above, it is known that the mutation of the acid residues of the consensus sequences of SUMO significantly inhibit Sumoylation, not so when the residue is modified by other post-translational modifications, consequently, we demonstrate specificity of the modification generating a TFEB mutant where both glutamic acid residues were mutated by alanine, with the double mutant E221A/E349A (SEQ ID No 6) which decreased the levels of Sumoylated TFEB as expected (FIG. 5).

Example 5. Activity of TFEB Mutants

To investigate the effect of the covalent modification of SUMO, as well as the different mutants of the invention on the transcriptional activity of TFEB, a luciferase reporter linked to a 4×CLEAR promoter region was used, since in its normal function TFEB joins the CLEAR promoter region, activating this pathway. The expression of the TFEB luciferase reporter in a dual luciferase system (TFEB reporter/control ring) after transfection was analyzed with an empty vector control, TFEB-WT, TFEB-K219R (SEQ ID No 1), TFEB-K347R (SEQ ID No 2) or double mutant TFEB K219R/K347R (SEQ ID No 3).

To make the results independent of endogenous TFEB interference, the reporter was evaluated on decreased VELA cells of TFEB (TFEB KO). Additionally, to eliminate possible interference in the results by the expression of other members of the MIT family, the TFEB reporter was also evaluated in decreased HeLa cells from TFEB, MITF and TFE3 (TFEB KO, MITF KO and TFE3 KO).

The results show that, under normal growth conditions, there is no significant expression of the 4×clear reporter in parental HeLa cells (Wt). Under the transfection of TFEB-WT there was no significant induction of the 4×CLEAR reporter, indicating that the CLEAR pathway is independent of the expression of TFEB under normal growth conditions. However, transfection with the single mutant K347R or the double mutant K219R/K347R, a strong activation of the reporter was observed.

Figure 6:
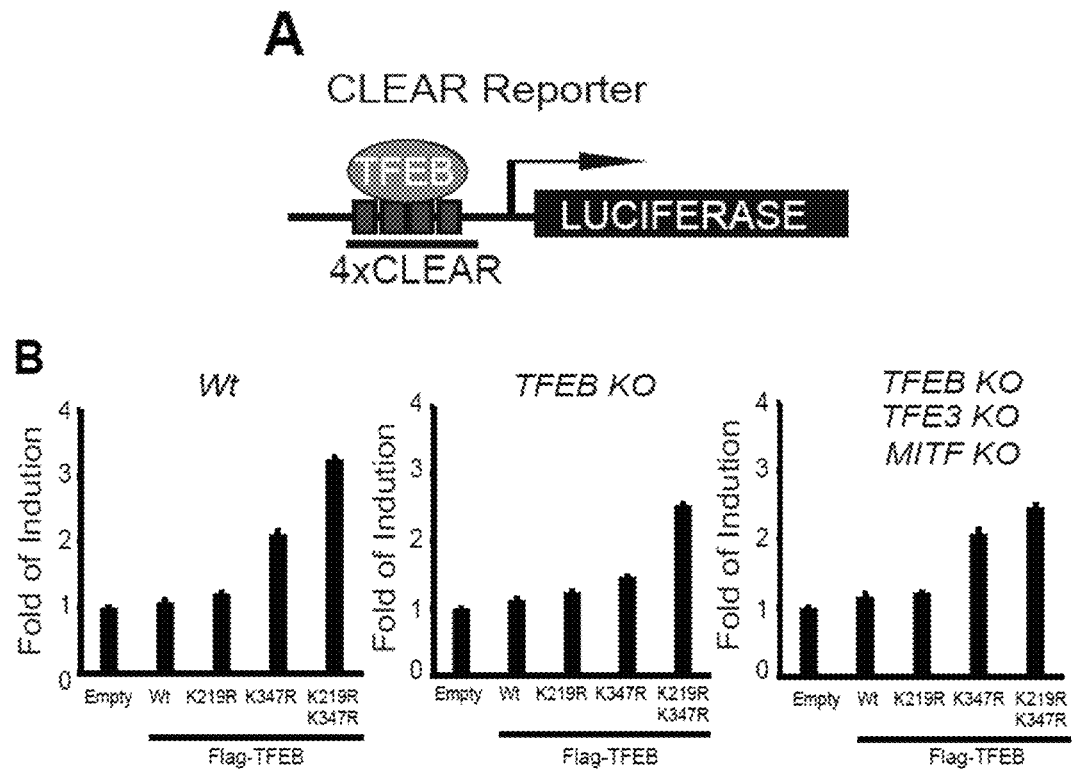

Similar results were obtained in the TFEB KO or TFEB/MITF/TFE3 KO cells when the double mutant TFEB K219R/K347R was expressed (FIG. 6). TFEB-WT does not activate the expression of the 4×CLEAR reporter. Transient transfection of TFEB WT causes only a slight induction of the tested target genes. We think that the modification of SUMO in the nucleus can act by restricting the activity of TFEB under normal growth conditions, so that by inhibiting sumoylation, the activity of TFEB increases.

Figure 7:
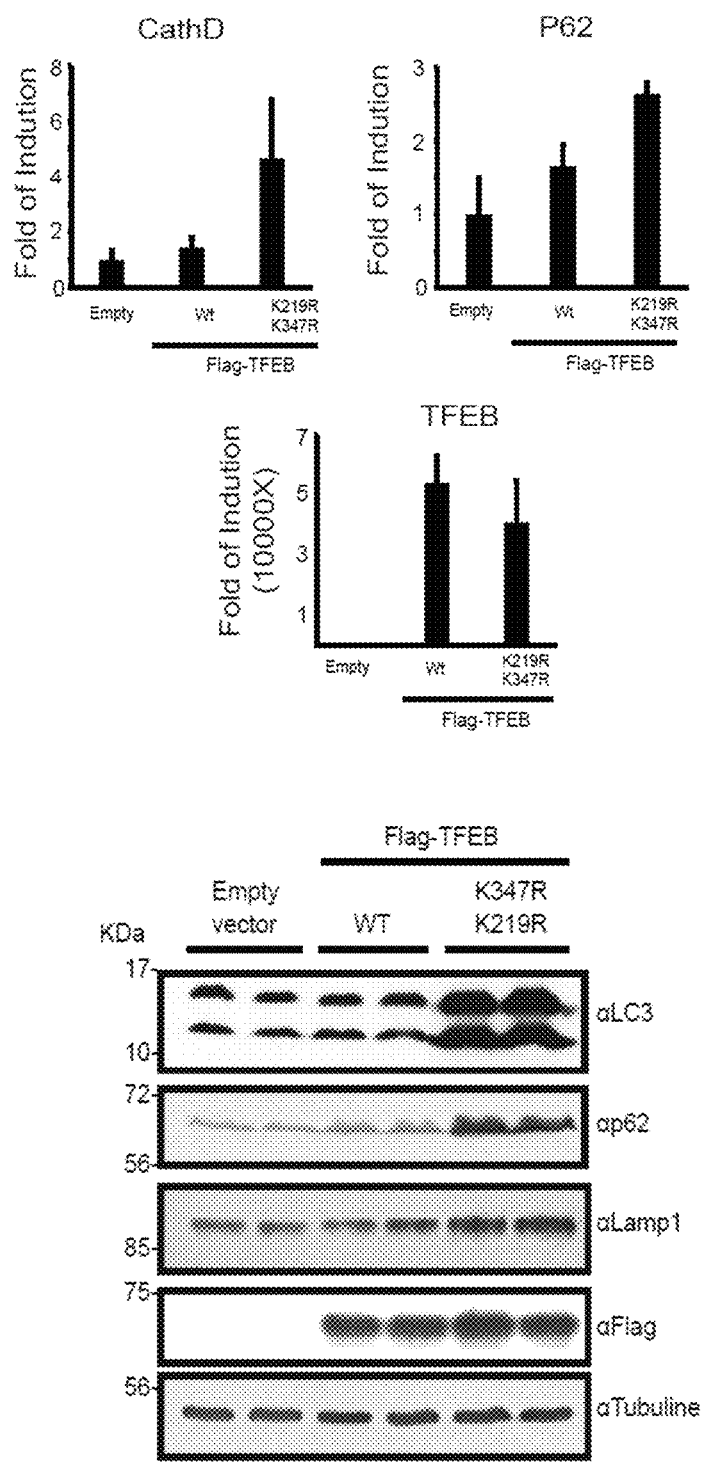
FIG. 7 Gene expression inducion related to autophagy and lysosome in HeLa cells by action of TFEB K219R/K347R sumoylation mutant d oble. Parental HeLa cells were transfected with TFEB WT and double mutant TFEB K219R/K347R to determine their effect on the expression of lysosomal and autophagy-related genes. The mutant is seen to increase the expression of CathD and P62 relative to the Wt, while the expression of transfected TFEB is greater than the expression of double mutant TFEB of the invention.

The expression levels of autophagy and lysosomal genes that are known targets of TFEB were analyzed by real-time PCR after nutrient depletion. The most sensitive genes were selected to analyze their expression in cells transfected with an empty vector, TFEB-WT or the mutant TFEB K219R/K347R with sumoylation alteration. In fact, the results show that altered TFEB sumoylation leads to an increase in its transcriptional activity, as both its white CathD and p62 genes were highly expressed compared to cells transfected with TFEB-WT. In addition, these results were confirmed by measuring the level of protein that tests the expression of CLEAR genes involved in lysosomal biogenesis (Lamp1 and CathD) and autophagy (LC3 and p62) (FIG. 7). It was shown that the loss of SUMO modification in TFEB changes to TFEB in a stronger transcription factor that leads to strong induction of the CLEAR target genes. Therefore, the results suggest that the loss of SUMO TFEB modification can be used as a therapeutic strategy to enhance proteolysis in diseases related to protein aggregation.

Example 6. Activity of TFEB Mutants

To determine the activity of the mutants of the invention in processes of lysosomal activation, tests were carried out with the accumulation of aggregates of huntingtin proteins (HTT) and alpha-Synuclein, in Hela cells, where a greater activity of TFEB should contribute to a greater degradation of these aggregates.

6.1 Huntingtin

For this, the exon1 85 polyQ of the huntingtin protein fused to GFP green fluorescent protein (PolyQ-htt) was transiently cotransfected, together with a vector containing unmutated TFEB (wt) Flag-wtTFEB or a mutated TFEB according to the invention, specifically the double mutant 219/347, Flag-TFEB K219R K347R, or a control vector (empty), in parental Hela cells or triple KO (depleted of TFEB, MITF and TFE3).

Figure 8:
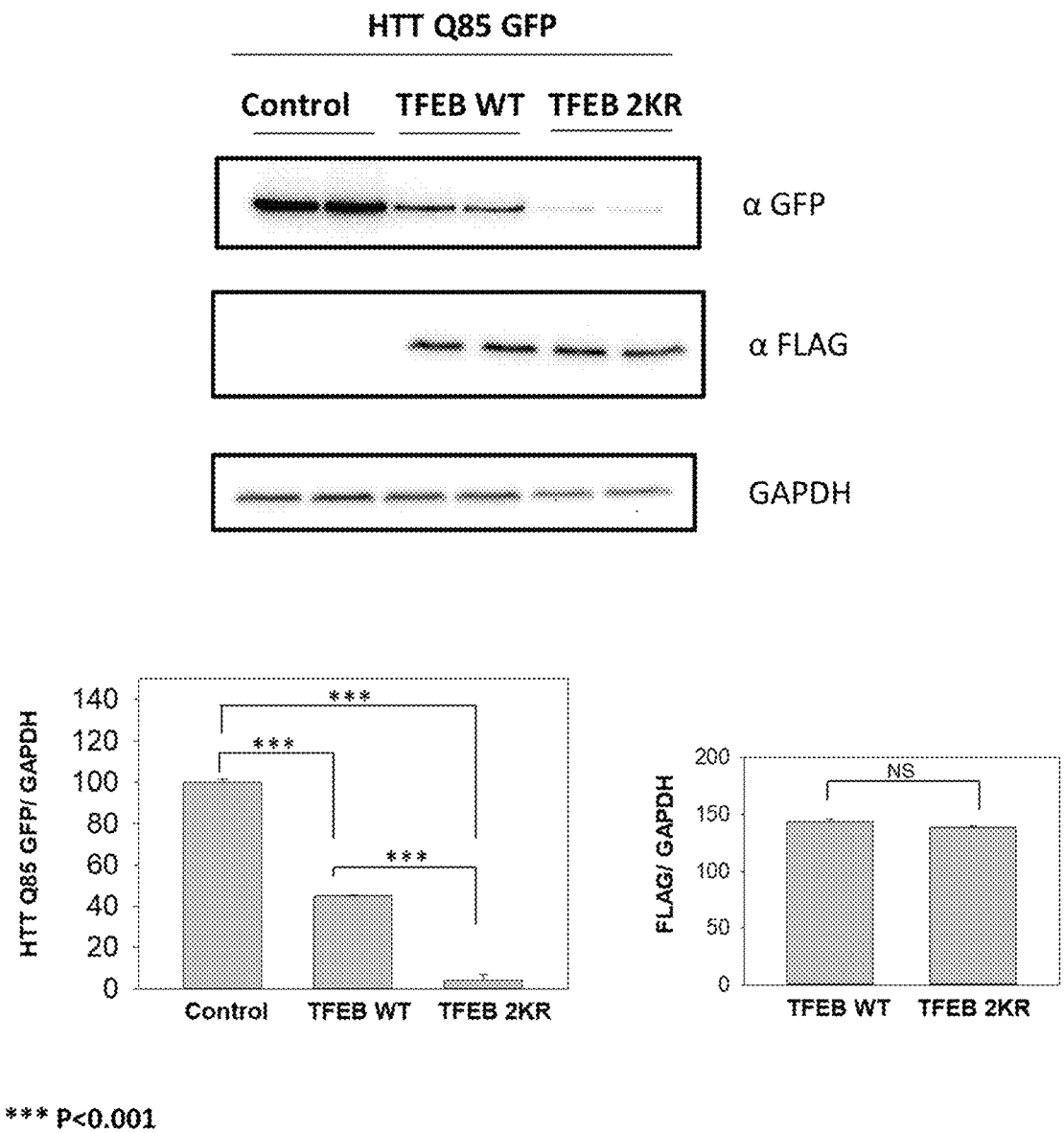
FIG. 8 Elimination of GFP aggregates (PolyQ-htt 85) by action of a double mutant TFEB K219/K347R. Parental HeLa cells and TFEB/TFE3/MITF triple KO were co-transfected with GFP (PolyQ-htt), and TFEB-WT or TFEB K219R/K347R to determine their effect on PolyQ-htt 85 aggregates. It is appreciated that the concentration of HTT Q85 aggregates is significantly lower in cells transformed with the mutant of the invention TFEB K219R/K347R, than in cells transfected with the wild protein TFEB WT, and that of the control, at similar levels of expression.

First, the amount of PolyQ-htt accumulated in each cell population was analyzed through western blot, and it was found that cells transfected with the mutant TFEB K219R/K347R have a significantly lower concentration of aggregates than cells transfected with native TFEB, and that of the control transfected with the empty vector (FIG. 8).

These findings strongly suggest that TFEB-K219/347R is a new enhancer of autophagy and lysosome biogenesis.

6.2 Alpha-Synuclein

Figure 9:
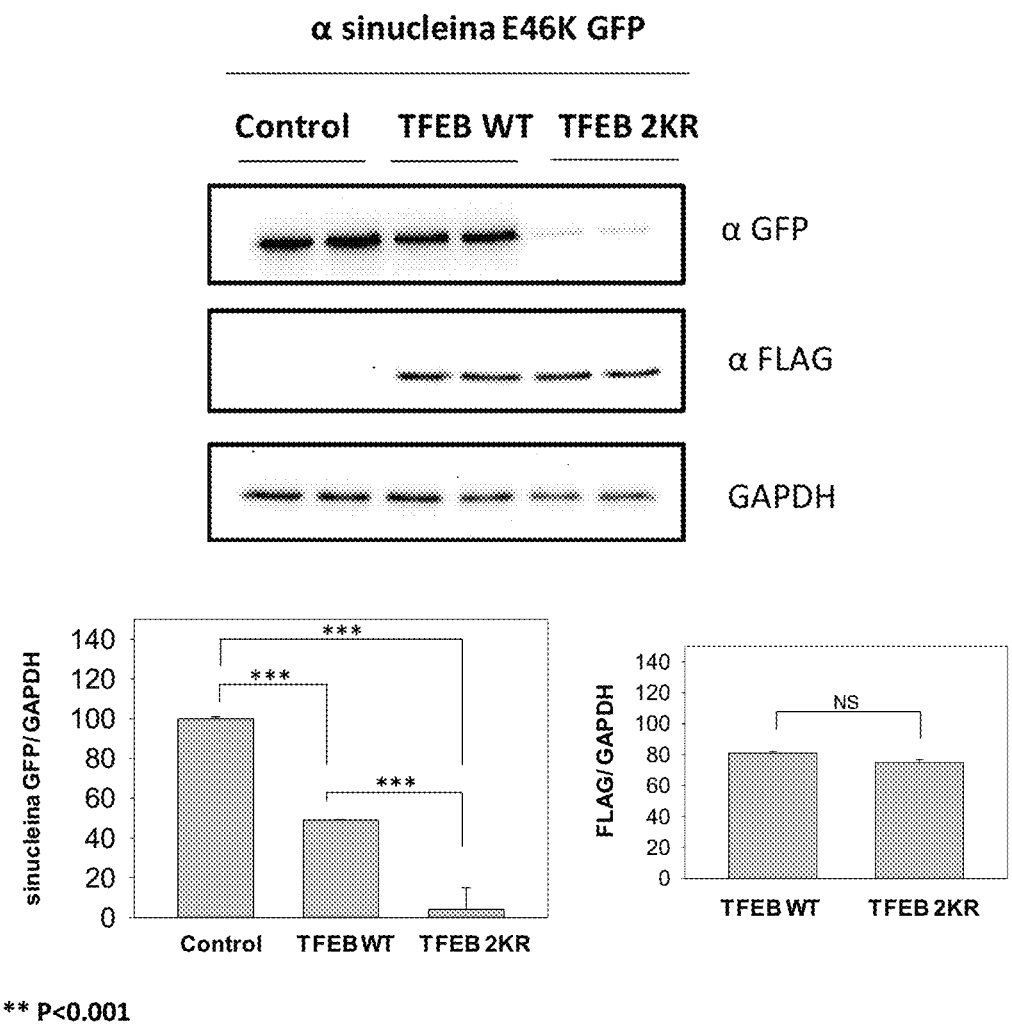
FIG. 9 Elimination of aggregates of GFP Alpha synuclein E46K by action of the double mutant TFEB K219/K347R. Parental HeLa cells and TFEB/TFE3/MITF triple KO were co-transfected with GFP-Alpha Synuclein and TFEB-WT or TFEB K219R/K347R to determine their effect on GFP-Alpha Synuclein E46K aggregates. It is observed that the concentration of Synuclein aggregates is significantly lower in cells transformed with the mutant of the invention TFEB K219R/K347R, than in cells transfected with the wild protein TFEB WT, and that of the control, at similar levels of expression.

Secondly, an experiment of similar characteristics to that described in 6.1 was performed, but now transfecting a fusion of the green fluorescent protein GFP with a mutant of the Alpha-Synuclein protein, which tends to add once it is transfected in cell cultures. As in the previous example, the protein forming aggregates were co-transfected with a vector containing an unmutated TFEB (wt) or a mutated TFEB according to the invention, specifically the double mutant 219/347, or a control vector (empty), in parental Hela cells or triple KO (depleted of TFEB, MITF and TFE3). The results show that the expression of a mutant according to the invention TFEB K219R K347R, induces a degradation of alpha synuclein aggregates significantly greater than that induced by TUB wt in relation to the control. (Figure-9)

In conclusion, this novel regulatory step in the biogenesis of lysosomes and autophagy, mutating the sites of modification by SUMO in TFEB, according to the invention opens new possibilities to modulate its expression in order to prevent the accumulation of toxic aggregates in cells.

Materials and Methods

Cell Culture

HeLa, HeLa TFEB KO and HeLa TFEB, MiTF and TFE3 triple KO cells were maintained at 37° C. in DMEM supplemented with 10% SFB and 100 units/ml of penicillin and streptomycin. In addition, HeLa His-SUMO1 and His-SUMO2 cells were supplemented with 4 μg/ml of puromycin. Plasmid transfection was performed with Lipofectamine 2000 (Invitrogen) according to the manufacturer's instructions, while the media were supplemented with Normocin (Invivogene).

Pull Down Ni-NTA and Western Blot

Cell lines that stably express 6×His-tag SUMO-1 and 6×His-tag SUMO-2, were denatured in Buffer Guanidinium (6 M Guanidinium HCl, 0.1 M Na2PO4, 0.1 M NaH2PO4, Imidazole 20 nM, BME 0.5%). His-tag SUMO1 and His-tag SUMO2 were bound to Ni-NTA particles (Qiagen) and fluids in elution buffer (NaCl 0.15 M, glycerol 10%, Tris-Hcl 0.5 M PH 6.8, SDS 10% and Imidazole 500 mM). The fluid proteins were analyzed by 12% SDS-PAGE, electrotransferred to nitrocellulose membrane and immunodetected with anti-SUMO-1, anti-SUMO-2 and anti-FLAG antibody to TFEB. The proteins were visualized by chemiluminescence (Pierce).

The antibodies used in this assay were: anti-CathD: Goat, RD, AF 1014; anti-LC3 rabbit, cell signalling, 2775S; anti-P62 Ick: mouse, BD Biosciences, No. 610832; anti-Flag M2: mouse, Sigma F1804.

Luciferase Reporter

A 4×CLEAR-luciferase reporter, obtained from Albert La Spada (Addgene plasmid #66800) 25108912, was co-transfected, along with a *Renilla* expression vector as expression control, in addition to TFEB wt and TFEB SUMO mutants.

For luciferase assays, the cells were lysed after washing twice with PBS 1× and then passive lysis buffer (Promega) supplemented with protease inhibitor was added directly into the plates following the manufacturer's protocol. Extracts were collected and centrifuged at 14000 rpm for 5 min. 30 μl of supernatant was transferred to each well of a 96-well plate (#655083, Greiner Bio-one). The determination of luciferase activity was determined using a Luciferase®, PROMEGA double indicator test system, in accordance with the manufacturer's instructions.

RT-q PCR

Total RNA was extracted using E.Z.N.A.® Total RNA Kit I (Omega Biotek) from HELA cells. The quality/purity ratios (260 nm/280 nm ratio and 260 nm/230 nm ratio) and concentration (260 nm absorbance) were determined by spectrophotometry using the NanoVue spectrophotometer (VWM). Then, 2.5 μg of each sample were reverse transcribed using oligo-dT and MMLV reverse transcriptase (Promega)) according to the providers' instructions.

Specific matcher pairs for human genes were designed for real-time quantitative PCR in the tempered cDNA (RT-qPCR) for tbp (mTBP1s TAGTCCAATGATGCCTTACG, mTBP2a TGGTCAGAGTTGAGAA TGG, 223 bp), catepsin (cell signalling), p62 (BD Biosciences) and TFEB (cell signalling). First, the specificity of all amplicons was verified by cloning and sequencing. mRNA levels were quantified in cDNA using qPCR with GoTaq® qPCR Master Mix (Promega) according to supplier instructions on an Mx3000 real-time thermocycler. In detail, the PCR consisted per cycle of a denaturation at 94° C. for 20 s, the alignment at 55° C. for 15 s and the extension at 72° C. for 15 s, with 40 total cycles, followed by a final extension at 95° C., revealing fusion curves of unique amplification products. All analyses were performed in triplicate. The level of expression of each gene was normalized with the expression of TBP as a reference gene with exon-spanning splitters to control genomic DNA contamination, as treatment with ADNase to total RNA was not included. RT-qPCR assays were analyzed with method 2 ($-\Delta\Delta Ct$) (Livak and Schmittgen, 2001) using the MxPro software (Stratagene) and expressed as relative amount to the normalizer (Pfaffl, 2001).

The invention claimed is:

1. Mutants of transcription factor EB also referred to as TFEB mutants,
   wherein the mutants are constitutively active by inability to be modified by SUMO,
   wherein amino acids of the mutants have been modified at at least two positions including lysine 219 and lysine 347 of a human TFEB.

2. The TFEB mutants according to claim 1, wherein the amino acids at the at least two positions are each independently replaced by any natural or artificial amino acid different from an original amino acid.

3. The TFEB mutants according to claim 1, wherein the mutants comprise an amino acid sequence of SEQ ID NO.: 3.

4. The TFEB mutants according to claim 1, wherein the amino acids at the at least two positions are each independently replaced by an amino acid different from the original amino acid, selected from the group consisting of serine, threonine, cysteine, asparagine, glutamine, tyrosine, glycine, alanine, valine, leucine, isoleucine, methionine, proline, phenylalanine, tryptophan, aspartic acid, glutamic acid, lysine, arginine, and histidine.

5. The TFEB mutants according to claim 4, wherein the lysine 219 and the lysine 347 of the human TFEB are replaced by arginine.

6. The mutants of TFEB according to claim 4, wherein the lysine 219 and the lysine 347 of the human TFEB are replaced by alanine.

7. A polynucleotide encoding the TFEB mutants according to claim 1.

* * * * *

SEQUENCE LISTING

<160> NUMBER OF SEQ ID NOS: 6

<210> SEQ ID NO 1
<211> LENGTH: 476
<212> TYPE: PRT
<213> ORGANISM: Human

<400> SEQUENCE: 1

Met Ala Ser Arg Ile Gly Leu Arg Met Gln Leu Met Arg Glu Gln Ala
1               5                   10                  15

Gln Gln Glu Glu Gln Arg Glu Arg Met Gln Gln Gln Ala Val Met His
            20                  25                  30

Tyr Met Gln Gln Gln Gln Gln Gln Gln Gln Gln Leu Gly Gly Pro
        35                  40                  45

Pro Thr Pro Ala Ile Asn Thr Pro Val His Phe Gln Ser Pro Pro Pro
50                  55                  60

Val Pro Gly Glu Val Leu Lys Val Gln Ser Tyr Leu Glu Asn Pro Thr
65                  70                  75                  80

Ser Tyr His Leu Gln Gln Ser Gln His Gln Lys Val Arg Glu Tyr Leu
                85                  90                  95

Ser Glu Thr Tyr Gly Asn Lys Phe Ala Ala His Ile Ser Pro Ala Gln
                100                 105                 110

Gly Ser Pro Lys Pro Pro Pro Ala Ala Ser Pro Gly Val Arg Ala Gly
            115                 120                 125

His Val Leu Ser Ser Ser Ala Gly Asn Ser Ala Pro Asn Ser Pro Met
    130                 135                 140

Ala Met Leu His Ile Gly Ser Asn Pro Glu Arg Glu Leu Asp Asp Val
145                 150                 155                 160

Ile Asp Asn Ile Met Arg Leu Asp Asp Val Leu Gly Tyr Ile Asn Pro
                165                 170                 175

Glu Met Gln Met Pro Asn Thr Leu Pro Leu Ser Ser Ser His Leu Asn
                180                 185                 190

Val Tyr Ser Ser Asp Pro Gln Val Thr Ala Ser Leu Val Gly Val Thr
            195                 200                 205

Ser Ser Ser Cys Pro Ala Asp Leu Thr Gln Arg Arg Glu Leu Thr Asp
    210                 215                 220

Ala Glu Ser Arg Ala Leu Ala Lys Glu Arg Gln Lys Lys Asp Asn His
225                 230                 235                 240

Asn Leu Ile Glu Arg Arg Arg Phe Asn Ile Asn Asp Arg Ile Lys
                245                 250                 255

Glu Leu Gly Met Leu Ile Pro Lys Ala Asn Asp Leu Asp Val Arg Trp
                260                 265                 270

Asn Lys Gly Thr Ile Leu Lys Ala Ser Val Asp Tyr Ile Arg Arg Met
            275                 280                 285

Gln Lys Asp Leu Gln Lys Ser Arg Glu Leu Glu Asn His Ser Arg Arg
        290                 295                 300

Leu Glu Met Thr Asn Lys Gln Leu Trp Leu Arg Ile Gln Glu Leu Glu
305                 310                 315                 320

Met Gln Ala Arg Val His Gly Leu Pro Thr Thr Ser Pro Ser Gly Met
                325                 330                 335

Asn Met Ala Glu Leu Ala Gln Val Val Lys Gln Glu Leu Pro Ser
                340                 345                 350

Glu Glu Gly Pro Gly Glu Ala Leu Met Leu Gly Ala Glu Val Pro Asp
            355                 360                 365

```
Pro Glu Pro Leu Pro Ala Leu Pro Pro Gln Ala Pro Leu Pro Leu Pro
    370                 375                 380
Thr Gln Pro Pro Ser Pro Phe His His Leu Asp Phe Ser His Ser Leu
385                 390                 395                 400
Ser Phe Gly Gly Arg Glu Asp Glu Gly Pro Pro Gly Tyr Pro Glu Pro
                405                 410                 415
Leu Ala Pro Gly His Gly Ser Pro Phe Pro Ser Leu Ser Lys Lys Asp
                420                 425                 430
Leu Asp Leu Met Leu Leu Asp Asp Ser Leu Leu Pro Leu Ala Ser Asp
            435                 440                 445
Pro Leu Leu Ser Thr Met Ser Pro Glu Ala Ser Lys Ala Ser Ser Arg
    450                 455                 460
Arg Ser Ser Phe Ser Met Glu Glu Gly Asp Val Leu
465                 470                 475

<210> SEQ ID NO 2
<211> LENGTH: 476
<212> TYPE: PRT
<213> ORGANISM: Human

<400> SEQUENCE: 2

Met Ala Ser Arg Ile Gly Leu Arg Met Gln Leu Met Arg Glu Gln Ala
1               5                   10                  15
Gln Gln Glu Glu Gln Arg Glu Arg Met Gln Gln Ala Val Met His
            20                  25                  30
Tyr Met Gln Gln Gln Gln Gln Gln Gln Gln Gln Leu Gly Gly Pro
            35                  40                  45
Pro Thr Pro Ala Ile Asn Thr Pro Val His Phe Gln Ser Pro Pro Pro
    50                  55                  60
Val Pro Gly Glu Val Leu Lys Val Gln Ser Tyr Leu Glu Asn Pro Thr
65                  70                  75                  80
Ser Tyr His Leu Gln Gln Ser Gln His Gln Lys Val Arg Glu Tyr Leu
                85                  90                  95
Ser Glu Thr Tyr Gly Asn Lys Phe Ala Ala His Ile Ser Pro Ala Gln
                100                 105                 110
Gly Ser Pro Lys Pro Pro Ala Ala Ser Pro Gly Val Arg Ala Gly
            115                 120                 125
His Val Leu Ser Ser Ser Ala Gly Asn Ser Ala Pro Asn Ser Pro Met
    130                 135                 140
Ala Met Leu His Ile Gly Ser Asn Pro Glu Arg Glu Leu Asp Asp Val
145                 150                 155                 160
Ile Asp Asn Ile Met Arg Leu Asp Asp Val Leu Gly Tyr Ile Asn Pro
                165                 170                 175
Glu Met Gln Met Pro Asn Thr Leu Pro Leu Ser Ser His Leu Asn
                180                 185                 190
Val Tyr Ser Ser Asp Pro Gln Val Thr Ala Ser Leu Val Gly Val Thr
    195                 200                 205
Ser Ser Ser Cys Pro Ala Asp Leu Thr Gln Lys Arg Glu Leu Thr Asp
    210                 215                 220
Ala Glu Ser Arg Ala Leu Ala Lys Glu Arg Gln Lys Lys Asp Asn His
225                 230                 235                 240
Asn Leu Ile Glu Arg Arg Arg Arg Phe Asn Ile Asn Asp Arg Ile Lys
                245                 250                 255
Glu Leu Gly Met Leu Ile Pro Lys Ala Asn Asp Leu Asp Val Arg Trp
                260                 265                 270
```

-continued

```
Asn Lys Gly Thr Ile Leu Lys Ala Ser Val Asp Tyr Ile Arg Arg Met
            275                 280                 285
Gln Lys Asp Leu Gln Lys Ser Arg Glu Leu Glu Asn His Ser Arg Arg
        290                 295                 300
Leu Glu Met Thr Asn Lys Gln Leu Trp Leu Arg Ile Gln Glu Leu Glu
305                 310                 315                 320
Met Gln Ala Arg Val His Gly Leu Pro Thr Thr Ser Pro Ser Gly Met
                325                 330                 335
Asn Met Ala Glu Leu Ala Gln Gln Val Val Arg Gln Glu Leu Pro Ser
            340                 345                 350
Glu Glu Gly Pro Gly Glu Ala Leu Met Leu Gly Ala Glu Val Pro Asp
        355                 360                 365
Pro Glu Pro Leu Pro Ala Leu Pro Pro Gln Ala Pro Leu Pro Leu Pro
370                 375                 380
Thr Gln Pro Pro Ser Pro Phe His His Leu Asp Phe Ser His Ser Leu
385                 390                 395                 400
Ser Phe Gly Gly Arg Glu Asp Glu Gly Pro Pro Gly Tyr Pro Glu Pro
                405                 410                 415
Leu Ala Pro Gly His Gly Ser Pro Phe Pro Ser Leu Ser Lys Lys Asp
            420                 425                 430
Leu Asp Leu Met Leu Leu Asp Asp Ser Leu Leu Pro Leu Ala Ser Asp
        435                 440                 445
Pro Leu Leu Ser Thr Met Ser Pro Glu Ala Ser Lys Ala Ser Ser Arg
450                 455                 460
Arg Ser Ser Phe Ser Met Glu Glu Gly Asp Val Leu
465                 470                 475

<210> SEQ ID NO 3
<211> LENGTH: 476
<212> TYPE: PRT
<213> ORGANISM: Human

<400> SEQUENCE: 3

Met Ala Ser Arg Ile Gly Leu Arg Met Gln Leu Met Arg Glu Gln Ala
1               5                   10                  15
Gln Gln Glu Glu Gln Arg Glu Arg Met Gln Gln Gln Ala Val Met His
            20                  25                  30
Tyr Met Gln Gln Gln Gln Gln Gln Gln Gln Gln Leu Gly Gly Pro
        35                  40                  45
Pro Thr Pro Ala Ile Asn Thr Pro Val His Phe Gln Ser Pro Pro Pro
    50                  55                  60
Val Pro Gly Glu Val Leu Lys Val Gln Ser Tyr Leu Glu Asn Pro Thr
65                  70                  75                  80
Ser Tyr His Leu Gln Gln Ser Gln His Gln Lys Val Arg Glu Tyr Leu
                85                  90                  95
Ser Glu Thr Tyr Gly Asn Lys Phe Ala Ala His Ile Ser Pro Ala Gln
            100                 105                 110
Gly Ser Pro Lys Pro Pro Ala Ala Ser Pro Gly Val Arg Ala Gly
        115                 120                 125
His Val Leu Ser Ser Ser Ala Gly Asn Ser Ala Pro Asn Ser Pro Met
    130                 135                 140
Ala Met Leu His Ile Gly Ser Asn Pro Glu Arg Glu Leu Asp Asp Val
145                 150                 155                 160
Ile Asp Asn Ile Met Arg Leu Asp Asp Val Leu Gly Tyr Ile Asn Pro
```

```
                    165                 170                 175
        Glu Met Gln Met Pro Asn Thr Leu Pro Leu Ser Ser His Leu Asn
                    180                 185                 190

Val Tyr Ser Ser Asp Pro Gln Val Thr Ala Ser Leu Val Gly Val Thr
                    195                 200                 205

Ser Ser Ser Cys Pro Ala Asp Leu Thr Gln Arg Arg Glu Leu Thr Asp
                    210                 215                 220

Ala Glu Ser Arg Ala Leu Ala Lys Glu Arg Gln Lys Lys Asp Asn His
        225                 230                 235                 240

Asn Leu Ile Glu Arg Arg Arg Phe Asn Ile Asn Asp Arg Ile Lys
                    245                 250                 255

Glu Leu Gly Met Leu Ile Pro Lys Ala Asn Asp Leu Asp Val Arg Trp
                    260                 265                 270

Asn Lys Gly Thr Ile Leu Lys Ala Ser Val Asp Tyr Ile Arg Arg Met
                    275                 280                 285

Gln Lys Asp Leu Gln Lys Ser Arg Glu Leu Glu Asn His Ser Arg Arg
                    290                 295                 300

Leu Glu Met Thr Asn Lys Gln Leu Trp Leu Arg Ile Gln Glu Leu Glu
        305                 310                 315                 320

Met Gln Ala Arg Val His Gly Leu Pro Thr Thr Ser Pro Ser Gly Met
                    325                 330                 335

Asn Met Ala Glu Leu Ala Gln Gln Val Val Arg Gln Glu Leu Pro Ser
                    340                 345                 350

Glu Glu Gly Pro Gly Glu Ala Leu Met Leu Gly Ala Glu Val Pro Asp
                    355                 360                 365

Pro Glu Pro Leu Pro Ala Leu Pro Pro Gln Ala Pro Leu Pro Leu Pro
                    370                 375                 380

Thr Gln Pro Pro Ser Pro Phe His His Leu Asp Phe Ser His Ser Leu
        385                 390                 395                 400

Ser Phe Gly Gly Arg Glu Asp Glu Gly Pro Pro Gly Tyr Pro Glu Pro
                    405                 410                 415

Leu Ala Pro Gly His Gly Ser Pro Phe Pro Ser Leu Ser Lys Lys Asp
                    420                 425                 430

Leu Asp Leu Met Leu Leu Asp Asp Ser Leu Leu Pro Leu Ala Ser Asp
        435                 440                 445

Pro Leu Leu Ser Thr Met Ser Pro Glu Ala Ser Lys Ala Ser Ser Arg
                    450                 455                 460

Arg Ser Ser Phe Ser Met Glu Glu Gly Asp Val Leu
        465                 470                 475

<210> SEQ ID NO 4
<211> LENGTH: 476
<212> TYPE: PRT
<213> ORGANISM: Human

<400> SEQUENCE: 4

Met Ala Ser Arg Ile Gly Leu Arg Met Gln Leu Met Arg Glu Gln Ala
        1                   5                   10                  15

Gln Gln Glu Glu Gln Arg Glu Arg Met Gln Gln Ala Val Met His
                    20                  25                  30

Tyr Met Gln Gln Gln Gln Gln Gln Gln Gln Leu Gly Gly Pro
                    35                  40                  45

Pro Thr Pro Ala Ile Asn Thr Pro Val His Phe Gln Ser Pro Pro Pro
                    50                  55                  60
```

```
Val Pro Gly Glu Val Leu Lys Val Gln Ser Tyr Leu Glu Asn Pro Thr
 65                  70                  75                  80

Ser Tyr His Leu Gln Gln Ser Gln His Gln Lys Val Arg Glu Tyr Leu
                 85                  90                  95

Ser Glu Thr Tyr Gly Asn Lys Phe Ala Ala His Ile Ser Pro Ala Gln
            100                 105                 110

Gly Ser Pro Lys Pro Pro Ala Ala Ser Pro Gly Val Arg Ala Gly
        115                 120                 125

His Val Leu Ser Ser Ser Ala Gly Asn Ser Ala Pro Asn Ser Pro Met
130                 135                 140

Ala Met Leu His Ile Gly Ser Asn Pro Glu Arg Glu Leu Asp Asp Val
145                 150                 155                 160

Ile Asp Asn Ile Met Arg Leu Asp Asp Val Leu Gly Tyr Ile Asn Pro
                165                 170                 175

Glu Met Gln Met Pro Asn Thr Leu Pro Leu Ser Ser Ser His Leu Asn
            180                 185                 190

Val Tyr Ser Ser Asp Pro Gln Val Thr Ala Ser Leu Val Gly Val Thr
        195                 200                 205

Ser Ser Ser Cys Pro Ala Asp Leu Thr Gln Lys Arg Ala Leu Thr Asp
210                 215                 220

Ala Glu Ser Arg Ala Leu Ala Lys Glu Arg Gln Lys Lys Asp Asn His
225                 230                 235                 240

Asn Leu Ile Glu Arg Arg Arg Phe Asn Ile Asn Asp Arg Ile Lys
                245                 250                 255

Glu Leu Gly Met Leu Ile Pro Lys Ala Asn Asp Leu Asp Val Arg Trp
            260                 265                 270

Asn Lys Gly Thr Ile Leu Lys Ala Ser Val Asp Tyr Ile Arg Arg Met
        275                 280                 285

Gln Lys Asp Leu Gln Lys Ser Arg Glu Leu Glu Asn His Ser Arg Arg
290                 295                 300

Leu Glu Met Thr Asn Lys Gln Leu Trp Leu Arg Ile Gln Glu Leu Glu
305                 310                 315                 320

Met Gln Ala Arg Val His Gly Leu Pro Thr Thr Ser Pro Ser Gly Met
                325                 330                 335

Asn Met Ala Glu Leu Ala Gln Gln Val Val Lys Gln Glu Leu Pro Ser
            340                 345                 350

Glu Glu Gly Pro Gly Glu Ala Leu Met Leu Gly Ala Glu Val Pro Asp
        355                 360                 365

Pro Glu Pro Leu Pro Ala Leu Pro Pro Gln Ala Pro Leu Pro Leu Pro
370                 375                 380

Thr Gln Pro Pro Ser Pro Phe His His Leu Asp Phe Ser His Ser Leu
385                 390                 395                 400

Ser Phe Gly Gly Arg Glu Asp Glu Gly Pro Pro Gly Tyr Pro Glu Pro
                405                 410                 415

Leu Ala Pro Gly His Gly Ser Pro Phe Pro Ser Leu Ser Lys Lys Asp
            420                 425                 430

Leu Asp Leu Met Leu Leu Asp Asp Ser Leu Leu Pro Leu Ala Ser Asp
        435                 440                 445

Pro Leu Leu Ser Thr Met Ser Pro Glu Ala Ser Lys Ala Ser Ser Arg
450                 455                 460

Arg Ser Ser Phe Ser Met Glu Glu Gly Asp Val Leu
465                 470                 475
```

<210> SEQ ID NO 5
<211> LENGTH: 476
<212> TYPE: PRT
<213> ORGANISM: Human

<400> SEQUENCE: 5

Met Ala Ser Arg Ile Gly Leu Arg Met Gln Leu Met Arg Glu Gln Ala
1               5                   10                  15

Gln Gln Glu Glu Gln Arg Glu Arg Met Gln Gln Gln Ala Val Met His
            20                  25                  30

Tyr Met Gln Gln Gln Gln Gln Gln Gln Gln Gln Leu Gly Gly Pro
        35                  40                  45

Pro Thr Pro Ala Ile Asn Thr Pro Val His Phe Gln Ser Pro Pro Pro
50                  55                  60

Val Pro Gly Glu Val Leu Lys Val Gln Ser Tyr Leu Glu Asn Pro Thr
65                  70                  75                  80

Ser Tyr His Leu Gln Gln Ser Gln His Gln Lys Val Arg Glu Tyr Leu
                85                  90                  95

Ser Glu Thr Tyr Gly Asn Lys Phe Ala Ala His Ile Ser Pro Ala Gln
            100                 105                 110

Gly Ser Pro Lys Pro Pro Pro Ala Ala Ser Pro Gly Val Arg Ala Gly
        115                 120                 125

His Val Leu Ser Ser Ser Ala Gly Asn Ser Ala Pro Asn Ser Pro Met
130                 135                 140

Ala Met Leu His Ile Gly Ser Asn Pro Glu Arg Glu Leu Asp Asp Val
145                 150                 155                 160

Ile Asp Asn Ile Met Arg Leu Asp Val Leu Gly Tyr Ile Asn Pro
                165                 170                 175

Glu Met Gln Met Pro Asn Thr Leu Pro Leu Ser Ser Ser His Leu Asn
            180                 185                 190

Val Tyr Ser Ser Asp Pro Gln Val Thr Ala Ser Leu Val Gly Val Thr
        195                 200                 205

Ser Ser Ser Cys Pro Ala Asp Leu Thr Gln Lys Arg Glu Leu Thr Asp
210                 215                 220

Ala Glu Ser Arg Ala Leu Ala Lys Glu Arg Gln Lys Lys Asp Asn His
225                 230                 235                 240

Asn Leu Ile Glu Arg Arg Arg Phe Asn Ile Asn Asp Arg Ile Lys
                245                 250                 255

Glu Leu Gly Met Leu Ile Pro Lys Ala Asn Asp Leu Asp Val Arg Trp
            260                 265                 270

Asn Lys Gly Thr Ile Leu Lys Ala Ser Val Asp Tyr Ile Arg Arg Met
        275                 280                 285

Gln Lys Asp Leu Gln Lys Ser Arg Glu Leu Glu Asn His Ser Arg Arg
290                 295                 300

Leu Glu Met Thr Asn Lys Gln Leu Trp Leu Arg Ile Gln Glu Leu Glu
305                 310                 315                 320

Met Gln Ala Arg Val His Gly Leu Pro Thr Thr Ser Pro Ser Gly Met
                325                 330                 335

Asn Met Ala Glu Leu Ala Gln Gln Val Val Lys Gln Ala Leu Pro Ser
            340                 345                 350

Glu Glu Gly Pro Gly Glu Ala Leu Met Leu Gly Ala Glu Val Pro Asp
        355                 360                 365

Pro Glu Pro Leu Pro Ala Leu Pro Pro Gln Ala Pro Leu Pro Leu Pro
370                 375                 380

-continued

Thr Gln Pro Pro Ser Pro Phe His His Leu Asp Phe Ser His Ser Leu
385                 390                 395                 400

Ser Phe Gly Gly Arg Glu Asp Glu Gly Pro Pro Gly Tyr Pro Glu Pro
            405                 410                 415

Leu Ala Pro Gly His Gly Ser Pro Phe Pro Ser Leu Ser Lys Lys Asp
        420                 425                 430

Leu Asp Leu Met Leu Leu Asp Asp Ser Leu Leu Pro Leu Ala Ser Asp
        435                 440                 445

Pro Leu Leu Ser Thr Met Ser Pro Glu Ala Ser Lys Ala Ser Ser Arg
    450                 455                 460

Arg Ser Ser Phe Ser Met Glu Glu Gly Asp Val Leu
465                 470                 475

<210> SEQ ID NO 6
<211> LENGTH: 476
<212> TYPE: PRT
<213> ORGANISM: Human

<400> SEQUENCE: 6

Met Ala Ser Arg Ile Gly Leu Arg Met Gln Leu Met Arg Glu Gln Ala
1               5                   10                  15

Gln Gln Glu Glu Gln Arg Glu Arg Met Gln Gln Gln Ala Val Met His
            20                  25                  30

Tyr Met Gln Gln Gln Gln Gln Gln Gln Gln Gln Leu Gly Gly Pro
        35                  40                  45

Pro Thr Pro Ala Ile Asn Thr Pro Val His Phe Gln Ser Pro Pro Pro
    50                  55                  60

Val Pro Gly Glu Val Leu Lys Val Gln Ser Tyr Leu Glu Asn Pro Thr
65                  70                  75                  80

Ser Tyr His Leu Gln Gln Ser Gln His Gln Lys Val Arg Glu Tyr Leu
                85                  90                  95

Ser Glu Thr Tyr Gly Asn Lys Phe Ala Ala His Ile Ser Pro Ala Gln
            100                 105                 110

Gly Ser Pro Lys Pro Pro Ala Ala Ser Pro Gly Val Arg Ala Gly
        115                 120                 125

His Val Leu Ser Ser Ser Ala Gly Asn Ser Ala Pro Asn Ser Pro Met
    130                 135                 140

Ala Met Leu His Ile Gly Ser Asn Pro Glu Arg Glu Leu Asp Asp Val
145                 150                 155                 160

Ile Asp Asn Ile Met Arg Leu Asp Asp Val Leu Gly Tyr Ile Asn Pro
                165                 170                 175

Glu Met Gln Met Pro Asn Thr Leu Pro Leu Ser Ser Ser His Leu Asn
            180                 185                 190

Val Tyr Ser Ser Asp Pro Gln Val Thr Ala Ser Leu Val Gly Val Thr
        195                 200                 205

Ser Ser Ser Cys Pro Ala Asp Leu Thr Gln Lys Arg Ala Leu Thr Asp
    210                 215                 220

Ala Glu Ser Arg Ala Leu Ala Lys Glu Arg Gln Lys Lys Asp Asn His
225                 230                 235                 240

Asn Leu Ile Glu Arg Arg Arg Arg Phe Asn Ile Asn Asp Arg Ile Lys
                245                 250                 255

Glu Leu Gly Met Leu Ile Pro Lys Ala Asn Asp Leu Asp Val Arg Trp
            260                 265                 270

Asn Lys Gly Thr Ile Leu Lys Ala Ser Val Asp Tyr Ile Arg Arg Met
        275                 280                 285

```
Gln Lys Asp Leu Gln Lys Ser Arg Glu Leu Glu Asn His Ser Arg Arg
    290             295                 300
Leu Glu Met Thr Asn Lys Gln Leu Trp Leu Arg Ile Gln Glu Leu Glu
305             310                 315                 320
Met Gln Ala Arg Val His Gly Leu Pro Thr Thr Ser Pro Ser Gly Met
            325                 330                 335
Asn Met Ala Glu Leu Ala Gln Gln Val Val Lys Gln Ala Leu Pro Ser
            340                 345                 350
Glu Glu Gly Pro Gly Glu Ala Leu Met Leu Gly Ala Glu Val Pro Asp
        355                 360                 365
Pro Glu Pro Leu Pro Ala Leu Pro Pro Gln Ala Pro Leu Pro Leu Pro
    370                 375                 380
Thr Gln Pro Pro Ser Pro Phe His His Leu Asp Phe Ser His Ser Leu
385             390                 395                 400
Ser Phe Gly Gly Arg Glu Asp Glu Gly Pro Pro Gly Tyr Pro Glu Pro
            405                 410                 415
Leu Ala Pro Gly His Gly Ser Pro Phe Pro Ser Leu Ser Lys Lys Asp
            420                 425                 430
Leu Asp Leu Met Leu Leu Asp Asp Ser Leu Leu Pro Leu Ala Ser Asp
        435                 440                 445
Pro Leu Leu Ser Thr Met Ser Pro Glu Ala Ser Lys Ala Ser Ser Arg
    450                 455                 460
Arg Ser Ser Phe Ser Met Glu Glu Gly Asp Val Leu
465             470                 475
```